(12) United States Patent
Groll et al.

(10) Patent No.: US 10,675,771 B2
(45) Date of Patent: Jun. 9, 2020

(54) INDUSTRIAL ROBOT AND METHOD FOR MOVING A ROBOT ARM IN A CLEAN ROOM

(71) Applicant: KUKA Deutschland GmbH, Augsburg (DE)

(72) Inventors: Christoph Groll, Augsburg (DE); Moritz Zasche, Augsburg (DE)

(73) Assignee: KUKA Deutschland GmbH, Augsburg (DE)

( * ) Notice: Subject to any disclaimer, the term of this patent is extended or adjusted under 35 U.S.C. 154(b) by 189 days.

(21) Appl. No.: 15/535,718

(22) PCT Filed: Dec. 15, 2015

(86) PCT No.: PCT/EP2015/079807
§ 371 (c)(1),
(2) Date: Jun. 14, 2017

(87) PCT Pub. No.: WO2016/096866
PCT Pub. Date: Jun. 23, 2016

(65) Prior Publication Data
US 2017/0361471 A1    Dec. 21, 2017

(30) Foreign Application Priority Data
Dec. 16, 2014  (DE) .................. 10 2014 226 144

(51) Int. Cl.
*B25J 19/00* (2006.01)
*B25J 21/00* (2006.01)
(Continued)

(52) U.S. Cl.
CPC ......... *B25J 19/0075* (2013.01); *B25J 21/005* (2013.01); *F16J 15/3228* (2013.01); *F16J 15/3204* (2013.01); *F16J 15/3284* (2013.01)

(58) Field of Classification Search
CPC .. B25J 19/0075; B25J 19/0058; B25J 21/005; F16J 15/3228; F16J 15/3204; F16J 15/3284
(Continued)

(56) References Cited

U.S. PATENT DOCUMENTS 3,489,420 A * 1/1970 Woodling ............ F16J 15/3284
                                                                  277/558
3,829,106 A * 8/1974 Wheelock ........... F16J 15/3204
                                                                  277/570
(Continued)

FOREIGN PATENT DOCUMENTS

DE      102004035658 A1   2/2005
DE         10348841 A1    6/2005
(Continued)

OTHER PUBLICATIONS

European Patent Office; Search Report and Written Opinion in International Patent Application No. PCT/EP2015/079807 dated May 23, 2016; 16 pages.
(Continued)

*Primary Examiner* — Victor L MacArthur
*Assistant Examiner* — T. Scott Fix
(74) *Attorney, Agent, or Firm* — Dorton & Willis, LLP

(57) ABSTRACT

An industrial robot includes a robot control configured to execute a robot program and a robot arm having a plurality of links connected by joints. The joints are configured to automatically adjust the links relative to one another according to the robot program, wherein at least one of the joints is configured as a rotary joint that connects a first link of the plurality of links to an adjacent second link for rotation relative to one another. The first link comprises a shaft sealing ring that has a sealing lip formed from a PTFE material, and the second link has a shaft portion with a
(Continued)

running surface formed from a PTFE material, on which the shaft sealing ring bears with its sealing lip in a sealing manner. A method for moving the robot arm in a clean room is also disclosed.

13 Claims, 3 Drawing Sheets

(51) Int. Cl.
*F16J 15/3228* (2016.01)
*F16J 15/3204* (2016.01)
*F16J 15/3284* (2016.01)

(58) Field of Classification Search
USPC .................................................. 74/490.05
See application file for complete search history.

(56) References Cited

U.S. PATENT DOCUMENTS

| | | | | |
|---|---|---|---|---|
| 4,699,387 A | * | 10/1987 | Buseth | F16J 15/32 277/556 |
| 4,709,932 A | * | 12/1987 | Edlund | F16J 15/3204 277/550 |
| 6,484,067 B1 | * | 11/2002 | Kinoshita | B25J 19/0062 277/534 |
| 8,662,280 B2 | * | 3/2014 | Matheisl | B66B 23/24 198/337 |
| 9,394,998 B2 | * | 7/2016 | Hatch | F16J 15/3232 |
| 9,447,793 B2 | * | 9/2016 | Korupp | F04D 29/026 |
| 2004/0169339 A1 | * | 9/2004 | Bock | F16J 15/3216 277/549 |
| 2006/0290068 A1 | * | 12/2006 | Berdichevsky | F16J 15/3228 277/549 |

FOREIGN PATENT DOCUMENTS

| | | | | |
|---|---|---|---|---|
| DE | 69937495 T2 | | 8/2008 | |
| DE | 102010062629 A1 | * | 6/2011 | .......... F16C 33/7823 |
| DE | 102010062629 A1 | | 6/2011 | |
| EP | 0347587 A2 | * | 12/1989 | ............. F16J 15/328 |
| EP | 1894684 A1 | | 3/2008 | |
| WO | 2013156851 A2 | | 10/2013 | |

OTHER PUBLICATIONS

German Patent Office; Examination Report in related German Patent Application No. 10 2014 226 144.9 dated Oct. 6, 2015; 4 pages.

* cited by examiner

INDUSTRIAL ROBOT AND METHOD FOR MOVING A ROBOT ARM IN A CLEAN ROOM

CROSS-REFERENCE

This application is a national phase application under 35 U.S.C. § 371 of International Patent Application No. PCT/EP2015/079807, filed Dec. 15, 2015 (pending), which claims the benefit of German Patent Application No. DE 10 2014 226 144.9 filed Dec. 16, 2014, the disclosures of which are incorporated by reference herein in their entirety.

TECHNICAL FIELD

The invention relates to an industrial robot comprising a robot control, which is configured to execute a robot program, and comprising a robot arm with several links, which are connected via joints, configured for the automatic mutual adjustment of the links according to the robot program, with at least one of the joints being configured as a rotary joint, which connects a first link of the several links to an adjacent second link of the several links for rotation in reference to each other. The invention relates additionally to a method for moving one of the robot arms arranged in a cleanroom.

BACKGROUND

A multi-axis industrial robot is known from DE 103 48 841 A1, in which a first of two parts, rotational in reference to each other, is embodied as a housing part of a transmission of the multi-axis industrial robot and a second part exits from the housing part, namely in the form of a driving or driven shaft as a second part. This device with at least two parts, rotational in reference to each other, comprises a seal between the parts that are rotational in reference to each other, with at least one additional seal being arranged between the parts that are rotational in reference to each other. At least one of the seals is made from polytetrafluoroethylene (PTFE).

SUMMARY

The object of the invention is to provide an industrial robot which can be used in cleanrooms, in particular in cleanrooms of the cleanroom class ISO 1.

The object of the invention is attained in an industrial robot comprising a robot control, which is embodied to execute a robot program, and comprises a robot arm with several links, which are connected via links, which are embodied to automatically adjust the links in reference to each other according to the robot program, with at least one of the joints being embodied as a rotary joint, which connects a first link of the multitude of links to an adjacent second link of the multitude of links for rotation in reference to each other, and with the first link comprising a shaft seal, which comprises a sealing lip made from PTFE-material (polytetrafluoroethylene material), and the second link comprising a shaft section, which shows a tread made from a PTFE-material, with the shaft seal contacting it with its sealing lip in a sealing fashion.

Industrial robots are work machines that can be equipped with tools for the automatic handling and/or processing of objects and with their joints being programmable in several axes of motion, for example with regards to orientation, position, and work processing.

The industrial robot comprises the robot arm and a programmable control (control device), which during operation controls and/or regulates the motion sequence of the industrial robot such that one or more joints (robot axes) that can be adjusted automatically or manually and are moved in particular by electric drives or motors, by the control unit controlling and/or regulating the drives according to a robot program automatically or in a manual operating mode.

Among other things, robot arms may comprise a frame and a carousel, which via a joint is supported rotationally in reference to the frame, at which carousel a link arm is supported pivotally via another joint. At the link arm here in turn a boom arm can be supported pivotally via another joint. The boom arm carries here a robot arm, with the boom arm and/or the robot hand potentially comprising additional joints. One, several, or all joints of the robot arm may be embodied as rotary joints.

The robot arm, comprising links connected via several joints, can be configured as an articulated robot with several serially arranged links and joints; in particular the robot arm can be embodied as a six-axle articulated robot. One, several, or all joints of the articulated robot can be embodied as rotary joints.

The industrial robot may comprise one or more rotary joints, which are respectively embodied with a rotary joint gap ring arrangement, with the rotary joint gap ring arrangement being formed by an inventive shaft seal, which comprises a sealing lip made from PTFE-material and comprises an inventive corresponding tread made from PTFE-material, which the shaft seal contacts with its sealing lip in a sealing fashion.

In general, a single joint of the robot arm may comprise an inventive rotary joint gap ring arrangement or two or several, in particular all joints of the robot arm may comprise respectively an inventive rotary joint gasket arrangement. An inventive rotary joint gap ring arrangement of a joint is explained hereinafter as a representative for all joints of the robot arm.

Inventive industrial robots are configured for operating within a cleanroom. Cleanrooms are operating areas sealed at least in a dust-tight fashion from the environment, in which objects are produced and/or assembled under particularly low-dust environmental conditions. Cleanrooms offer the possibility to keep low any contamination by airborne particles inside the cleanroom and/or to reduce it.

The European standard EN ISO 14644 for example refers to the contamination by airborne particles, comprising among other things a classification of air quality. In a cleanroom, per definition, the concentration of airborne particles is controlled. For this purpose the cleanroom is designed and used such that the number of particles introduced into the cleanroom and/or produced in the cleanroom is kept as low as possible. Here, other parameters relevant for cleanliness can be controlled as well, such as temperature, humidity, and/or pressure.

When objects shall be produced and/or assembled not manually but automatically within such a cleanroom, industrial robots may be used. For this purpose the industrial robots have to be configured with regards to the special conditions of a cleanroom particularly such that the industrial robot contaminates the cleanroom with particles as little as possible, thus according to the specifications of the standard EN ISO 14644 the number of particles developing by the industrial robot in the cleanroom must be kept as low as possible. Particles commonly generated and emitted by the industrial robot inside the cleanroom are abrasion particles, which are particularly produced and emitted in the area of the joints of the industrial robot, preferably at the rotary joints of the industrial robot, by components that are adjustable in reference to each other, for example by two adjacent links of a rotary joint of the robot arm generating mutual friction and causing the abrasion particles to be generated and entered into the cleanroom.

According to the invention it is therefore provided that the first link comprises a shaft seal, which comprises a sealing lip made from a PTFE-material and the second link comprises a shaft section, which comprises a tread made from a PTFE-material, with the shaft seal contacting it with its sealing lip, resulting in the development of abrasion particles being minimized, and thus the number of airborne particles in a clean room in which the robot arm is arranged can be kept as low as possible. Via the general embodiment of an inventive industrial robot, particularly via an individual or an arbitrarily combined embodiment of one or more variants described hereinafter, an industrial robot can be created which can be operated in a reliable fashion in cleanrooms, particularly those of the classification level ISO-class 1 (EN ISO 14644).

In a particular embodiment the second link may comprise a shaft section, which comprises a tread made from a POM-PTFE copolymer material (polyoxymethylene-polytetrafluoroethylene copolymer material). The tread made from the POM-PTFE copolymer material can be applied on a shaft section of a steel shaft. Optionally the tread can be produced as a special part, separate from the second link which shows the shaft section, and fastened on said shaft section or applied as an initially flowing material, such as a liquid or a powder and/or a granulate on the shaft section and fastened thereon.

Based on its material features the applied POM-PTFE copolymer material can be processed by machining, for example, particularly stripped. By such a machining process an external jacket wall of the tread can be produced in a particularly precisely formed fashion. In particular, the surface roughness can be adjusted to the sealing lip of the shaft seal.

For example, in a first variant of the invention the tread is formed by an external jacket wall of a tread ring, which is fastened on the shaft section of the second link. Such a tread ring can initially be produced separated from the second link and/or separated from the shaft section of the second link. The tread ring can be produced entirely and/or exclusively from the PTFE-material or the POM-PTFE copolymer material. Alternatively the tread ring may show a core made from a different material and provided with a jacket wall made from the PTFE-material or the POM-PTFE copolymer material. In general, the tread ring may be fastened with various bonding methods on the shaft section of the second link.

In a particular type of bonding the tread ring can be fastened by bonding, particularly a thermal bonding on the shaft section. The bonding of the tread ring on the shaft section of the second link can particularly represent adhesion or welding.

In an alternative type of bonding the tread ring may be fastened on the shaft section by press-fitting, particularly shrink-wrapping. For example the thread ring may be fixed on the shaft section by a longitudinal compression, i.e. axially pushing and/or pressing onto the shaft section of the second link in a force-fitting fashion.

As an alternative to longitudinal compression, the tread ring may also be fixed on the shaft section by lateral compression. During the lateral compression the shaft section can be cooled and/or the tread ring can be heated such that the tread ring can be pushed with little force upon the shaft section. Subsequently the temperature is equalized, by which compression develops of the tread ring on the shaft section, resulting in the tread ring being fixed on the shaft section. Particularly in the embodiments of a separate tread ring to be mounted, here the tread ring can be produced from a POM-PTFE copolymer material. When the tread ring is made from a POM-PTFE copolymer material, particularly the sealing lip of the shaft seal can be produced from a POM-free PTFE-material, particularly a PTFE-monomer material.

As an alternative to bonding a tread ring on the shaft section, the tread can also be produced as a PTFE-layer applied on the shaft section by coating, particularly powder coating the shaft section of the second link using a PTFE-material, particularly a PTFE-powder or a PTFE-powder mixture. In case of powder coating, here PTFE-powder can be applied on the shaft section and solidified by sintering. As an alternative to powder coating the tread made from PTFE can also be applied in a liquid coating—spray method.

In all suitable variants of the embodiments described the sealing lip of the shaft seal and the tread may comprise and/or be produced from the same PTFE-material and/or POM-PTFE copolymer material.

The sealing lip of the shaft seal can generally represent a sealing lip without a tension spring. When the sealing lip of the shaft seal represents a sealing lip without a tension spring a sealing arrangement can be generated that is particularly resistant to abrasions, with the sealing lip resting on the tread in a sealing fashion only under minor stress, particularly without and/or almost without any stress, i.e. bias force. When the sealing lip rests on the tread without and/or almost without any stress, i.e. bias force, the sealing lip and/or the tread are worn to a particular low extent and only very little abrasion can develop, keeping particularly low the particles introduced into the cleanroom by movements of the robot arm.

This way the shaft seal can for example represent a membrane shaft seal.

The shaft seal and/or the tread may form a fundamental sealing arrangement of the respective rotary joint of the robot arm. Alternatively, the rotary joints of the robot arm may be configured with sealing arrangements of prior art, with then an inventive sealing arrangement, i.e. an inventive pairing of shaft seal and tread being embodied at separate housing capsules, and such housing capsules can be placed upon the robot arms on the outside, covering the sealing arrangement of the respective rotary joint known per se. By arranging such housing capsules on the outside of the robot arm, covering the sealing arrangement of the respective rotary joint, known per se, existing robot arms, initially not suited for the use in cleanrooms, can be retrofitted according to the invention and rendered suitable for cleanrooms.

The object according to the invention is additionally attained in a method for moving robot arms arranged in a cleanroom, particularly according to one or more of the embodiments of an industrial robot as described, comprising the step of automatically moving at least one rotary joint of the robot arm maximally at an angular velocity at which the sealing lip of the shaft seal moves with a relative velocity in reference to the tread which is below 1 meter per second (1 m/s).

In addition to the described embodiment of the sealing arrangement with the shaft seal and the inventive treads, an entrance of airborne particles into the cleanroom due to abrasion of shaft seals and treads of the robot arm can be further reduced by moving the respective rotary joint of the robot arm maximally with an angular velocity at which the sealing lip of the shaft seal moves with a relative velocity in reference to the tread which is below 1 meter per second (1 m/s). In order to achieve this a robot program can be programmed accordingly such that the inventive rotary joints can only be moved with angular velocities reduced to this extent.

Alternatively, or additionally the drives of the robot arm can be designed and/or controlled such that regardless of the respective robot programs the rotary joints can be controlled maximally with an angular velocity at which the sealing lip of the shaft seal moves with a velocity in reference to the tread which is below 1 meter per second (1 m/s).

BRIEF DESCRIPTION OF THE DRAWINGS

Various exemplary embodiments of the invention are shown in the attached schematic illustrations as examples. Concrete features of these exemplary embodiments can represent general characteristics of the invention regardless of in what concrete context they are mentioned, perhaps even individually or in combinations when analyzed.

DETAILED DESCRIPTION

Figure 1:
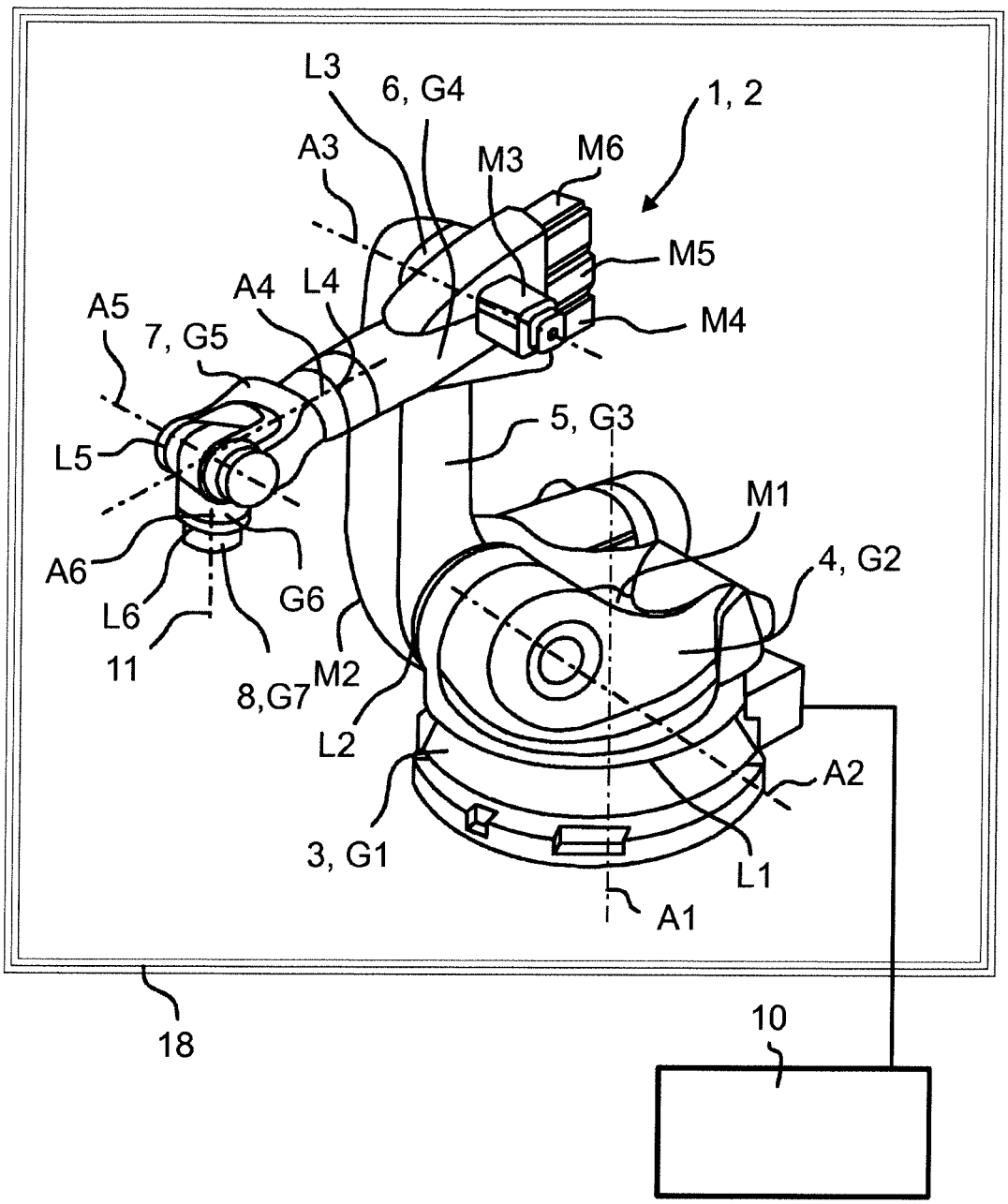
FIG. 1 is a perspective view of an industrial robot comprising a robot arm and a robot control.

FIG. 1 shows an industrial robot 1, which comprises a robot arm 2 and a robot control 10. In the case of the present exemplary embodiment, the robot arms 2 comprises several links G1 to G7, arranged behind each other and connected via joints L1 to L6.

The robot control 10 of the industrial robot 1 is configured and/or implemented to perform a robot program, by which the joints L1 to L6 of the robot arm 2 according to the robot program can be adjusted and/or moved rotationally in an automated fashion or in a manual operation. For this purpose the robot control 10 is connected to the controllable electric drives M1 to M6, which are embodied to adjust the joints L1 to L6 of the industrial robot 1.

In case of the present exemplary embodiment the links G1 to G7 represent a frame 3 and a carousel 4 supported rotationally about an axis A1 extending vertically in reference to the frame 3. Additional links of the robot arm 2 are a link arm 5, a boom arm 6, and a robot hand 7, preferably comprising several axes, with a fastening device configured as a flange 8 for fastening a tool 11. The link arm 5 is pivotally supported at the lower end, i.e. at the joint L2 of the link arm 5, which can also be called a pivot bearing head, on the carousel 4 about a preferably horizontal rotary axis A2.

At the upper end of the link arm 5, at the first joint L3 of the link arm 5, another also preferably horizontal axis A3 of the boom arm 6 is supported pivotally. It carries at the end the robot hand 7 with its preferably three axes of rotation A4, A5, and A6. The joints L1 to L6 can generally be driven by respectively one of the electric drives M1 to M6, controlled by programs of the robot control 10. In general, here a transmission 12 may be provided between each of the links G1 to G7 and the respectively corresponding electric drive M1 to M6.

FIG. 1 shows here an industrial robot 1 comprising a robot control 10, which is configured to execute a robot program, as well as comprising a robot arm 2 with several links G1-G7, which are connected via joints L1-L6, configured for an automatic mutual adjustment of the links G1-G7 according to the robot program, with at least one of the joints being configured as a rotary joint L1-L6, which connects a first link 14 of several links G1-G7 to an adjacent second link 15 of the plurality of links G1-G7 for rotating them in reference to each other.

Figure 2:
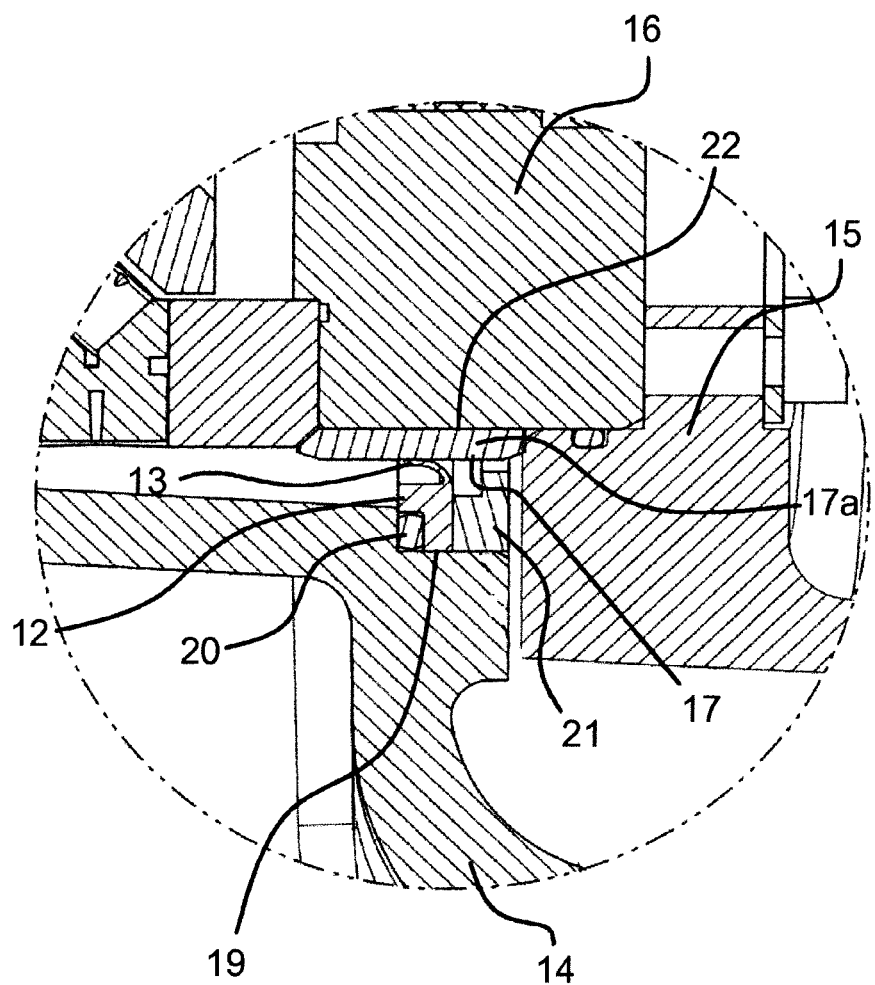
FIG. 2 is a cross-sectional detail through an exemplary rotary joint of the robot arm according to FIG. 1, which comprises an inventive shaft seal with a sealing lip made from a PTFE-material and a tread ring separated from the shaft section made from a POM-PTFE copolymer material.

In FIG. 2 a rotary joint of the robot arm 2 is shown according to FIG. 1, which at a first link 14 of the robot arm 2 comprises an inventive shaft seal 12 with a sealing lip 13 made from a PTFE-material and at a shaft section 16 a second link 15 comprises a separate tread ring 17a made from a POM-PTFE copolymer material.

The first link 14 comprises therefore a shaft seal 12, which comprises a sealing lip 13 made from a PTFE-material, with the second link 15 comprising a shaft section 16, which comprises a tread 17 made from a PTFE-material at which the shaft seal 12 contacts with a sealing lip 13 in a sealing fashion.

The first link 14 is formed by a first housing part of the robot arm 2. This first housing part comprises a seat 19 for the shaft seal 12. The shaft seal 12 can in this way be pushed onto the seat 19 and for example fixed axially and radially between an O-ring 20 and a circlip 21. The tread ring 17a is fastened on a stop 22 of the shaft section 16. The shaft section 16 is connected fixed to the second link 15. The second link 15 is here formed by a second housing part of the robot arm 2.

In case of the present exemplary embodiment of FIG. 2 the tread ring 17a and thus also the tread 17 are made from a POM-PTFE copolymer material.

The tread 17 is here formed by an external jacket wall of the tread ring 17a. The tread ring 17a is fastened on the shaft section 16 of the second link 15.

The tread ring 17a can for example be fastened by bonding, particularly thermal bonding or press-fitting, particularly shrink-wrapping, on the shaft section 16.

In case of the present exemplary embodiment of FIG. 2 the sealing lip 13 of the shaft seal 12 is a sealing lip 13 without a tension spring, particularly a membrane shaft seal.

In case of the present exemplary embodiment of FIG. 2 the sealing lip 13 is configured as a single sealing lip. In case of the present exemplary embodiment of FIG. 2 the sealing lip 13 may however also be configured like the embodiment described hereinafter according to FIG. 3 as a double gasket.

In the embodiment shown in FIG. 2, in which the first link 14 of the robot arm 2 comprises the shaft seal 12 with a sealing lip 13 made from a PTFE-material and the second link 15 at the shaft section 16 the separate tread ring 17a made from a POM-PTFE copolymer material, the industrial robot 1 can be controlled via its robot control 10 for moving robot arms 2 arranged in a cleanroom 18 (FIG. 1) such that an automatic movement of at least one rotary joint occurs maximally at an angular velocity at which the sealing lip 13 of the shaft seal 12 moves with a relative velocity in reference to the tread 17, which is slower than 1 meter per second (1 m/s).

Figure 3:
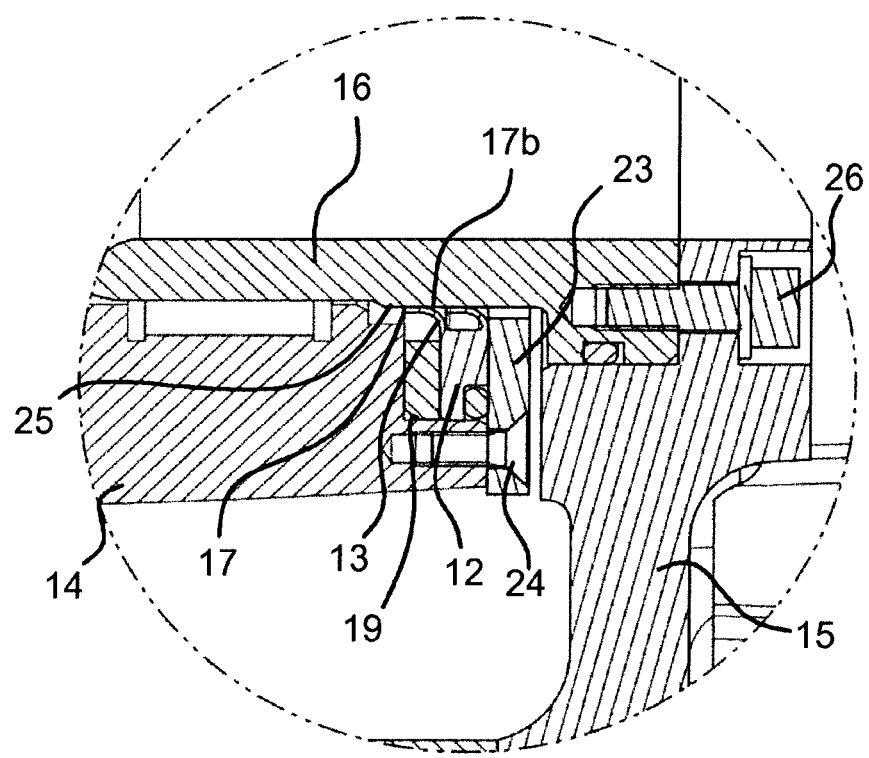
FIG. 3 is a cross-sectional detail through an exemplary rotary joint of the robot arm according to FIG. 1, which comprises an inventive shaft seal with a sealing lip made from a PTFE-material and a tread in the form of a coating comprising PTFE-material.

FIG. 3 shows a rotary joint of the robot arm according to FIG. 1, which comprises an inventive shaft seal 12 with a sealing lip 13 made from a PTFE-material and a tread 17 in the form of a coating 17b made from PTFE-material.

In this alternative embodiment as well the first link 14 comprises a shaft seal 12, which comprises a sealing lip 13 made from a PTFE-material, with the second link 15 comprising a shaft section 16, which shows a tread 17 made from a PTFE-material, which is configured as a coating, i.e. PTFE-layer 17b, at which the shaft seal 12 contacts with its sealing lip 13 in a sealing fashion.

The first link 14 is also formed in this embodiment by a first housing part of the robot arm 2. This first housing part comprises a seat 19 for the shaft seal 12. The shaft seal 12 can be pushed onto the seat 19 such, and for example be fixed between an O-ring 20 and a circlip 21 axially and radially by a clamping ring 23, which is screwed at the face via screws 24 to the first link. The coating, i.e. the PTFE-layer 17b, is applied on a surface section 25 of the shaft section 16. The shaft section 16 is connected via additional screws 26 in a fixed, but detachable fashion to the second link 15. The second link 15 is here formed by a second housing part of the robot arm 2.

In case of the present exemplary embodiment of FIG. 3 the sealing lip 13 is configured as a double gasket. In case of the present exemplary embodiment of FIG. 3 the sealing lip 13 can however also be configured as a single sealing lip like in the embodiment according to FIG. 2.

The tread 17 is produced according to FIG. 3 by coating, particularly powder coating of the shaft section 16 of the second link 15 with a PTFE-material, particularly a PTFE-powder or a PTFE-powder mixture. To this extent the tread 17 is formed by a PTFE-layer 17b applied on the shaft section 16.

In case of the exemplary embodiment of FIG. 3 the sealing lip 13, and/or the double sealing lip of the shaft seal 12 and the tread 17 and/or the coating 17b are made from the same PTFE-material.

In case of the present exemplary embodiment of FIG. 3 the sealing lip 13 of the shaft seal 12 is also a sealing lip 13 without a tension spring, particularly a diaphragm shaft seal. In the embodiment shown in FIG. 3 the rotary joint of the robot arm 2 is a sealing lip 13 made from a PTFE-material and a tread 17 in the form of a coating 17b made from PTFE-material, the industrial robot 1 can be controlled via its robot control unit 10 for moving the robot arm 2 arranged in a cleanroom 18 (FIG. 1) such that any automatic movement of at least one rotary joint occurs maximally at an angular velocity at which the sealing lip 13 of the shaft seal 12 moves with a relative velocity in reference to the tread 17 which is below 1 meter per second (1 m/s).

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. An industrial robot comprising:
a robot control configured to execute a robot program;
a robot arm with a plurality of links connected by joints, the joints configured for automatic mutual adjustment of the links according to the robot program;
at least one of the joints configured as a rotary joint connecting a first link of the plurality of links to an adjacent second link for relative rotation of the first and second links;
the first link comprising a shaft seal which includes a sealing lip made from a PTFE material;
the second link comprising a shaft section which includes a tread made from a PTFE material;
the sealing lip of the shaft seal contacting the tread in a sealing fashion;
wherein the second link comprises a shaft section including a tread made from a POM-PTFE copolymer material; and
wherein the robot control is configured to move at least one rotary joint of the robot arm at a maximum angular velocity, whereby the sealing lip of the shaft seal moves with a relative velocity in reference to the tread which is less than 1 meter per second.

2. The industrial robot of claim 1, wherein the tread is formed by an external jacket wall of a tread ring which is fastened on the shaft section of the second link.

3. The industrial robot of claim 2, wherein the tread ring is fastened on the shaft section of the second link by bonding.

4. The industrial robot of claim 3, wherein the tread ring is fastened on the shaft section by thermal bonding.

5. The industrial robot of claim 2, wherein the tread ring is fastened on the shaft section of the second link by compression.

6. The industrial robot of claim 5, wherein the compression comprises shrink-wrapping the tread ring on the shaft section.

7. The industrial robot of claim 1, wherein the tread is produced by coating the shaft section of the second link with PTFE-material, thereby forming a PTFE-layer on the shaft section.

8. The industrial robot of claim 7, wherein the tread is produced by powder coating, the shaft section of the second link.

9. The industrial robot of claim 8, wherein the powder coating comprises a PTFE-powder or a PTFE-powder mixture.

10. The industrial robot of claim 1, wherein the sealing lip of the shaft seal and the tread are made from the same PTFE-material.

11. The industrial robot of claim 1, wherein the sealing lip of the shaft seal does not include a tension spring.

12. The industrial robot of claim 1, wherein the shaft seal is a membrane shaft seal.

13. A method for moving a robot arm of an industrial robot arranged in a cleanroom, the method comprising:
obtaining a robot, the robot including:
a robot control configured to execute a robot program,
a robot arm with a plurality of links connected by joints, the joints configured for automatic mutual adjustment of the links according to the robot program,
at least one of the joints configured as a rotary joint connecting a first link of the plurality of links to an adjacent second link for relative rotation of the first and second links,
the first link comprising a shaft seal which includes a sealing lip made from a PTFE material, and the second link comprising a shaft section which includes a tread made from a POM-PTFE copolymer material, the sealing lip of the shaft seal contacting the tread in a sealing fashion; and actuating with the robot control the automatic movement of at least one rotary joint of the robot arm at a maximum angular velocity, whereby the sealing lip of the shaft seal moves with a relative velocity in reference to the tread which is less than 1 meter per second.

* * * * *